United States Patent [19]
Shibayama

[11] Patent Number: 6,111,448
[45] Date of Patent: Aug. 29, 2000

[54] CLOCK SIGNAL DISTRIBUTION CIRCUIT

[75] Inventor: Atsufumi Shibayama, Tokyo, Japan

[73] Assignee: NEC Corporation, Tokyo, Japan

[21] Appl. No.: 09/150,932

[22] Filed: Sep. 10, 1998

[30] Foreign Application Priority Data

Sep. 10, 1997 [JP] Japan ................................ 9-244893

[51] Int. Cl.[7] .................................................. G06F 1/10
[52] U.S. Cl. ........................................... 327/293; 327/291
[58] Field of Search .................................. 327/291, 292, 327/293, 294, 295, 296; 713/503

[56] References Cited

FOREIGN PATENT DOCUMENTS

| 4-205326 | 7/1992 | Japan | ................................ G06F 1/10 |
| 4-229634 | 8/1992 | Japan | ............................ H01L 21/82 |
| 5-268206 | 10/1993 | Japan | ................................ H04L 7/00 |
| 6-149408 | 5/1994 | Japan | ................................ G06F 1/10 |
| 08054957 | 2/1996 | Japan | ................................ G06F 1/10 |
| 8-44455 | 2/1996 | Japan | ................................ G06F 1/04 |
| 8-54957 | 2/1996 | Japan | ................................ G06F 1/10 |
| 8-181586 | 12/1996 | Japan | ............................... H03K 5/00 |
| 9-134226 | 5/1997 | Japan | . |
| 9-330142 | 12/1997 | Japan | ................................ G06F 1/10 |

*Primary Examiner*—Tuan T. Lam
*Assistant Examiner*—Linh Nguyen
*Attorney, Agent, or Firm*—McGinn & Gibb, P.C.

[57] ABSTRACT

A global clock forming circuit for forming a global clock signal is set up on an LSI, and global clock signal is distributed on LSI by the double global clock distribution circuits cycled on the LSI in parallel with and in the inverse direction to one another. Based on the time point at the middle point of the transition point of each of the two clock signals transmitted by the global clock distribution circuit, the local clock signals are generated by the local clock generating circuits 4-(i+1), 4-(i+2), 4-j, 4-(k+1), 4-(l+1). The resulting local clock signals are distributed by the local clock distribution circuits 5-(i+1), 5-(i+2), 5-j, 5-(k+1), 5-(l+1). By this procedure, the clock signal distribution circuit can distribute low skew and high speed clock signals on a large scale integrated circuit.

26 Claims, 14 Drawing Sheets

CLOCK DISTRIBUTION ADDRESS

CLOCK SIGNAL DISTRIBUTION CIRCUIT

BACKGROUND OF THE INVENTION

1. Field of the Invention

The present invention relates to a clock signal distribution circuit, and more particularly, to a clock signal distribution circuit for distributing a clock signal at high speed and with less phase displacement on a large scale integrated circuit.

2. Related Art

As the large scale integrated circuit (hereinafter to be referred to as LSI) is formed into a larger scale and the operating frequencies increase, the relative phase displacement between the clock signals distributed on LSI, or so-called clock skew has become a large problem. AS the synchronous type LSI operation is based on the design or premise that each part of LSI is given its timing simultaneously by the clock signal, the presence of the clock skew provides a limitation to the upper limit of the operating frequencies of the synchronous type LSI, with the result that the performance is lowered.

Heretofore, as a technique to reduce the clock skew, there is known a clock tree system having the constitution of the clock buffer and clock line in a tree form. In this clock signal distribution circuit, as shown in FIG. 1, the same clock buffer 111 in each stage of the clock tree and carrying out the design layout to make the load capacity and line resistance identical with one another, delay of the propagation route from the input end of the clock tree to each output end is made to be the same. By this step, it can be expected to make the phase difference of the clock signal at the output ends relatively small to reduce the clock skew.

However, in the clock tree system as described above, a large limitation arises in the design layout in order to align the conditions of the respective clock tree routes, and practically, due to the relations of layout with other circuits or restrictions, it is difficult to align all route conditions.

There is another problem for the clock buffer 112 of the dummy and the line inserted in the clock tree to align the conditions causes an increase in the power consumption or circuit area. Furthermore, as the clock tree system is a static skew compensation by equalization at the time of the design and layout of each clock distribution route, it is not possible to compensate the clock skew for the cause of the device deviation, temperature variation, and power supply voltage fluctuation, etc. Further, as the LSI process is shrunk, the effect of coupling with other line is also non-negligible, and it is difficult to compensate it at the time of the design layout.

On the other hand, as another technique there is known a huge buffer system for driving it with a giant clock buffer. In this clock signal distribution circuit, as shown in FIG. 2, because each destination of clock distribution is short-circuited, there can be expected an effect of mutually compensating the clock skews between the destinations of the clock distribution.

However, in the huge buffer system as described above, because all the clock distribution destinations are simultaneously caused to transit, there are required a giant clock buffer 121 and a low resistance, i.e., broad width clock line 122. Therefore, power consumption and layout area are large, and especially the application to a high speed clock distribution by more than 1 GHz in a large scale LSI in the future is difficult.

A method of carrying out the phase compensation of the clock signal dynamically, not at the time of designing but at the time of operating, includes a method of arranging the clock transmission route in a double ring form or in turning back, dynamically forming a clock signal based on the phase difference between the two clock signals transmitted through these transmission routes at each destination of clock distribution, and distributing it to be neighboring areas. This method is disclosed in Japanese Patent Application Laid-Open No.8-54957 and Japanese Patent Application Laid-Open No.9-134226.

The clock distribution system described in JP-A No.8-54957 has a single stripe circulating route formed by two sets of mutually parallel transmission routes. The same phase clock signals are transmitted an the reverse direction to each other from a certain part of this surrounding route. Also, the plural clock receiving parts are placed as optional parts on the above surrounding route, so that there is formed a clock signal forming the middle point between the variation point of the receiving clock signal from the one side transmission route and the variation point of the receiving clock signal from the other transmission route as a timing standard.

The clock distribution system described in JP-A No.9-134226 constitutes a forward transmission route part and a rearward transmission route part by turning back halfway the transmission routes for supplying the clock signals to plural ICs from the clock supply source for synchronously operating the plural ICs in a manner to make the mutual transmission routes inverse to each other. Each IC detects the phase difference between the first clock signal input from the forward transmission route part and the second clock signal input from the rearward transmission route and generates the internal clock signal by the phase difference.

In these conventional clock signal distribution circuits, phase compensation is dynamically effected at the time of the operation, and it is possible to make compensation for clock skew caused by the scattering of the device, temperature variation, and fluctuation of power supply voltage, etc.

However, as the line in the LSI a very small cross-sectional area of line, it has large line resistance and is difficult to transmit high speed clock signals by a long line extending over the whole LSI. Accordingly, it is extremely difficult to apply the above technique to a high speed clock distribution of more than 1 GHz in the large scale LSI, especially by the future micro-process of no more than 0.1 $\mu$m.

SUMMARY OF THE INVENTION

An object of the present invention is to provide a clock signal distribution circuit by which a low skew and high speed clock can be distributed on the LSI.

The clock signal distribution circuit according to the present invention comprises global clock forming means for forming a global clock signal based on the reference clock signal inputted from the external source, global clock distributing means for distribution the global clock signal formed in the above global clock forming means in the large scale integrated circuit and placed in the large scale integrated circuit in double loop form in reverse direction to each other formed in the global clock forming means, local clock forming means for forming a local clock signal on the basis of the intermediate phase of each phase of the two global clock signals distributed by the above global clock distribution means, and local clock distribution means for distributing the local clock signal formed in the local clock forming means to a region in the vicinity of the local means.

That is to say, the clock signal distribution circuit of the present invention forms a global clock signal with the global clock forming means provided at an optional place on the LSI, and distributes the global clock signal on the LSI by the global clock distribution means circulated doubly and in parallel on the LSI in reverse direction from each other.

On the basis of the intermediate point of the respective transition points of the two clock signals transmitted by the double clock distribution means constituting the global clock distribution means a plurality of local clock forming means for generating the local clock signals are connected to the optional part of the global clock distribution means, and local clock distribution means are connected for distributing the local clock signal in the vicinity thereof.

Also, since the double clock distribution means constituting the global clock distribution means are set up in parallel and in reverse direction, the intermediate clock of the transition clocks of the two clock signals transmitted by the double clock distribution means is the same without respect to the position on the global clock distribution means.

By such steps, the local clock generation means peculiarly generates the local clock signals to be distributed to the neighborhood thereof and the local clock distribution means distributes the local clock signals to the neighborhood of the local means, it becomes possible to compensate for the effects of device deviation, temperature variation, and power supply voltage fluctuation, etc., and to distribute the clocks to the whole LSI area at a low skew.

Also, as the global clock distribution means is divided by the clock buffer, it becomes possible to make high speed clock distribution, and to reduce the effects of inter-line coupling and noise.

DESCRIPTION OF THE PREFERRED EMBODIMENT

Figure 1:
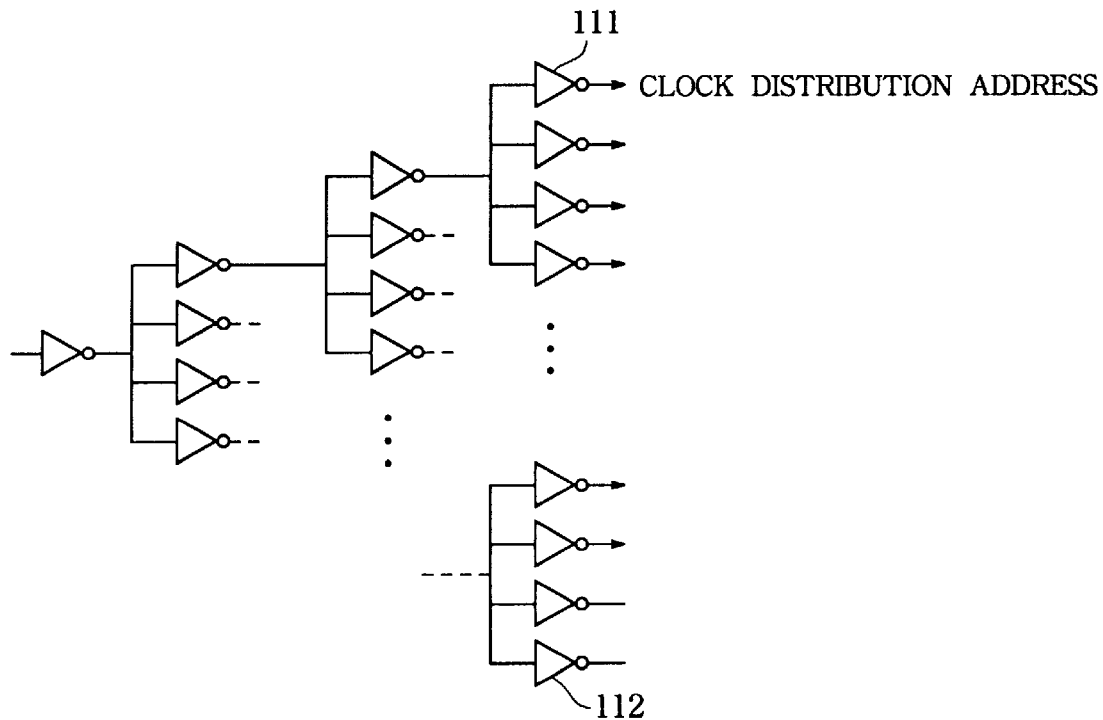
FIG. 1 is a block diagram showing a constitution example of a conventional clock distribution circuit.
Figure 2:
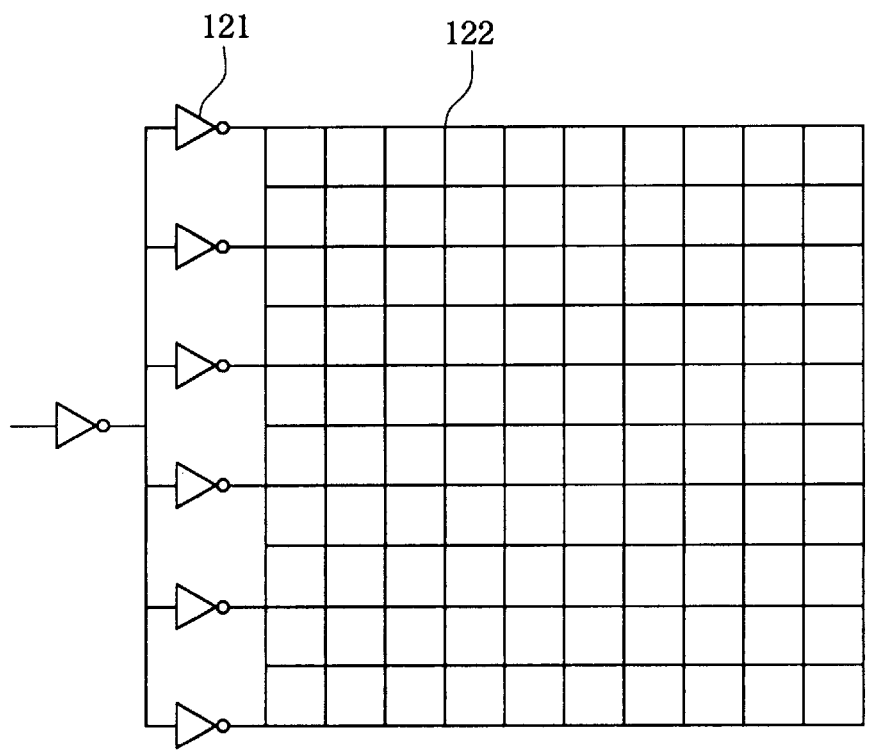
FIG. 2 is a block diagram showing another constitution example of a conventional clock distribution circuit.
Figure 3:
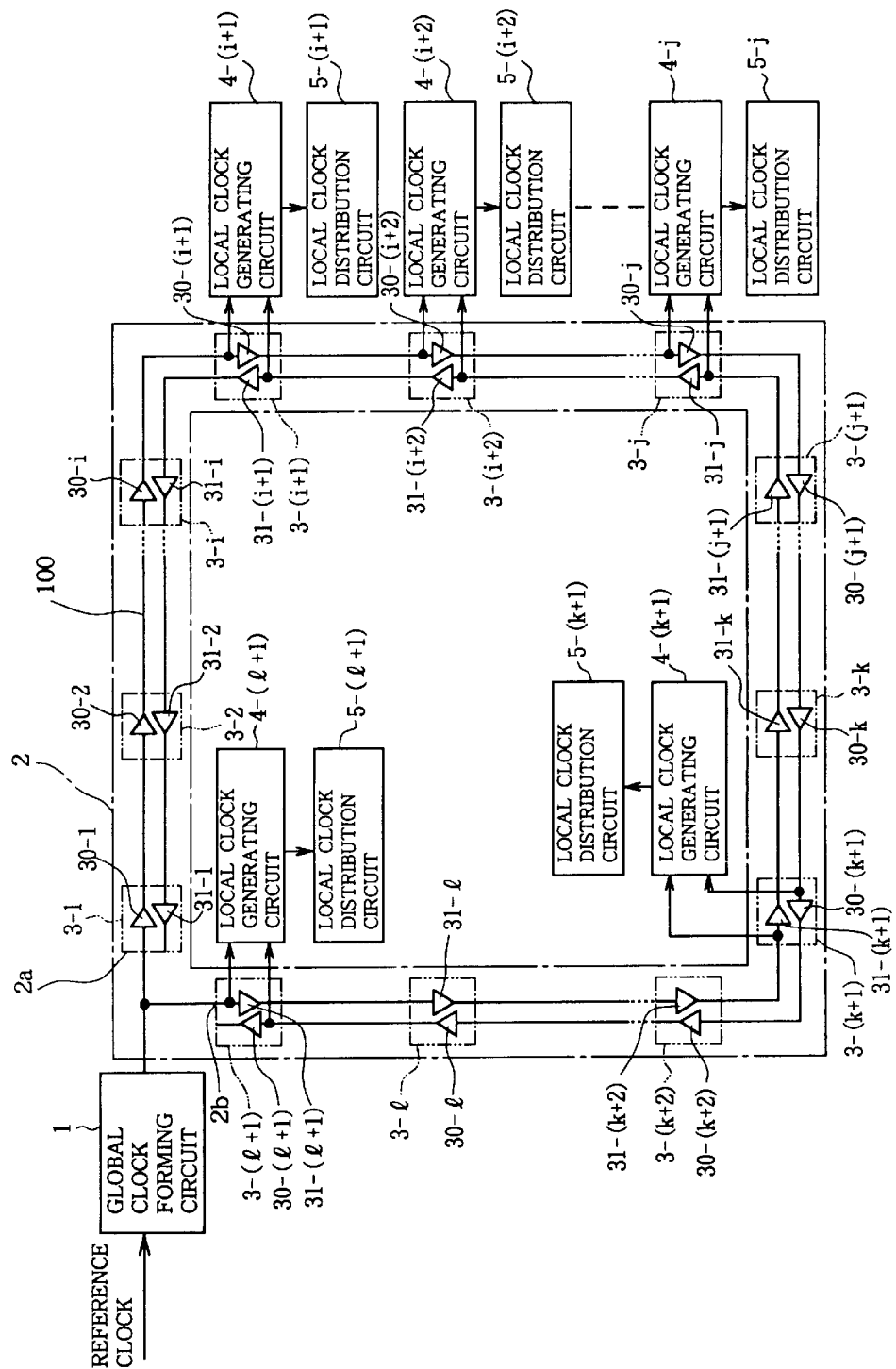
FIG. 3 is a block diagram showing a constitution of the clock signal distribution circuit according to one embodiment of the present invention.

Next, an embodiment of the present invention is explained with reference to the drawing. FIG. 3 is a block diagram showing the constitution of the clock signal distribution circuit according to an embodiment of the present invention. In the drawing, the clock signal distribution circuit according to an embodiment of the present invention is constituted by a global clock forming circuit 1, a global clock distribution circuit 2, a plurality of clock buffer couples 3-m (m=1, 2, ..., i+1, i+2, ..., j, j+1, ..., k, k+1, k+2, ..., 1+1), a plurality of local clock generating circuits 4-m, and a plurality of local clock distribution circuits 5-m.

The global clock forming circuit 1 forms a global clock signal based on the reference clock signal inputted from the outside of the LSI (e.g., the circuit which includes all the circuits in the drawing). The global clock distribution circuit 2 connected to the global clock forming circuit 1 distributes the global clock signal formed in the global clock forming circuit 1.

A plurality of the clock buffer couples 3-m are constituted by laying out the two clock buffers 30-m, 31-m adjacent to each other. These two clock buffers 30-m, 31-m are connected by the two global clock line 100 which are mutually laid out in parallel with each other and connected to the global clock distribution circuit 1 and form the double and mutually reverse oriented loop form clock transmission circuits.

A plurality of the local clock generating circuits 4-m each form the local clock signals based on the global clock signals which are connected to the optional places of the global clock distribution circuit 2 and distributed by the global clock distribution circuit 2. The local clock distribution circuits 5-m connected to the local clock generating circuits 4-m each distribute in their neighborhood the local clock signals formed in the local clock generating circuits 4-m.

The input ends 2a, 2b of the double and mutually reverse oriented loop form clock transmission circuits are either laid out in adjacent relations or connected to the global clock forming circuit 1 by the line of mutually equal length, by which the global clock signals of the same phase are inputted to the two clock transmission circuits and distribute the global clock signals in reverse direction to each other on the LSI.

The local clock generating circuits 4-m and the local clock distribution circuits 5-m are provided to meet the plural circuit blocks which constitute the LSI (not illustrated). The local clock generating circuits 4-m use the two global clock signals transmitted by the global clock distribution circuit 2 as the inputs, form the local clock signals on the basis of the intermediate o'clock of the transition o'clocks of the two global clock signals, and distribute the local clock signals in the circuit blocks corresponding to each by the local clock distribution circuits 5-m.

Figure 4:
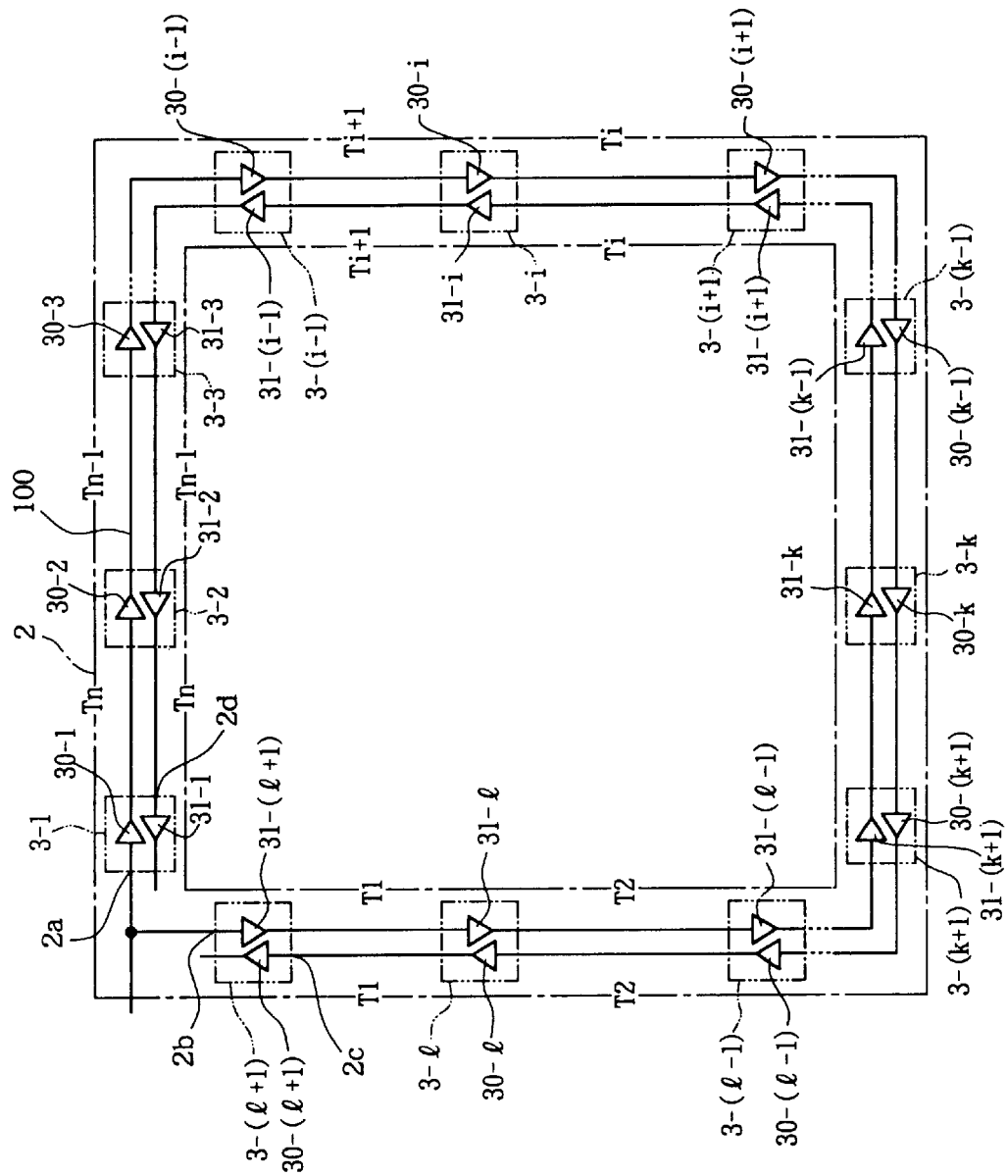
FIG. 4 is a view showing an operation of the global clock distribution circuit of FIG. 3.
Figure 5:
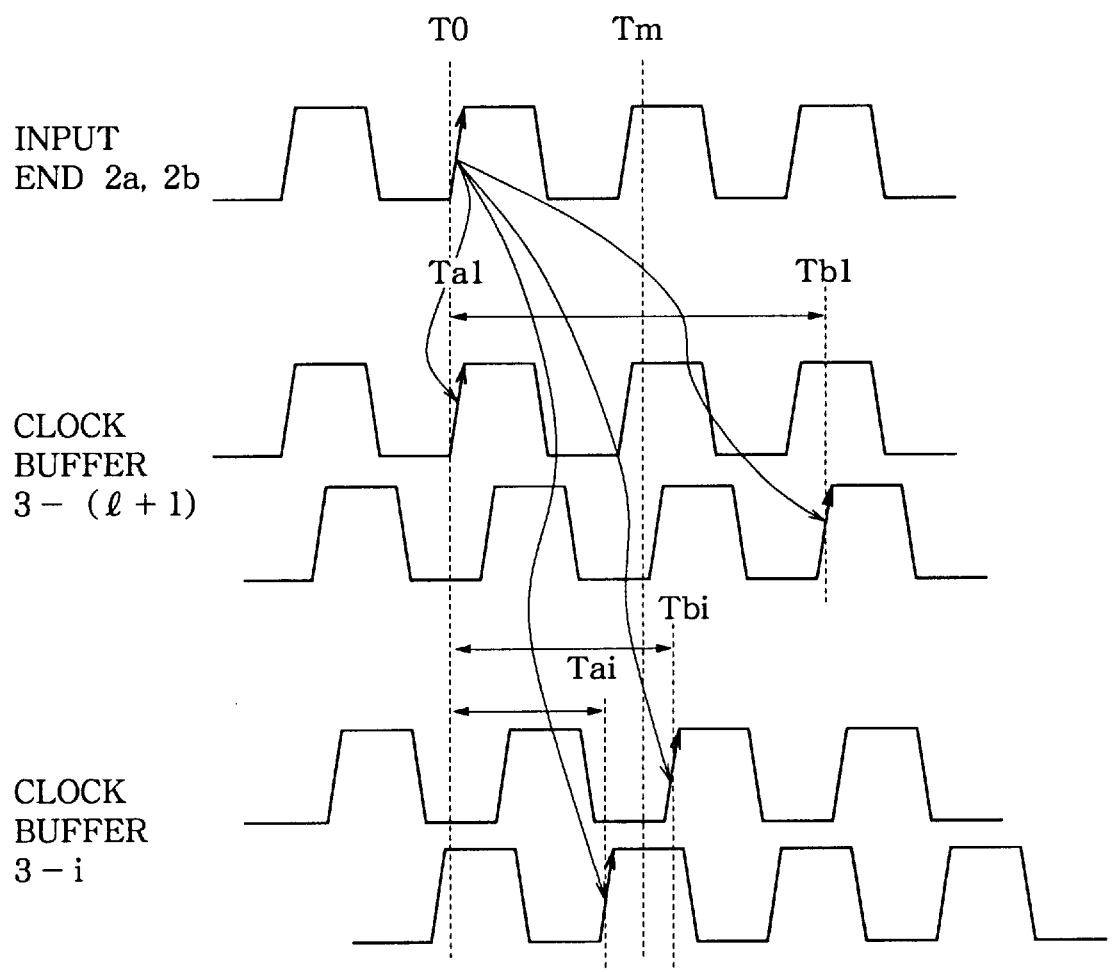
FIG. 5 is a timing chart showing an operation of the global clock distribution circuit of FIG. 3.

FIG. 4 is a view showing the operation of the global clock distribution circuit 2 of FIG. 3, and FIG. 5 is a timing chart showing the operation of the global clock distribution circuit 2 of FIG. 3. Referring to these FIG. 4 and FIG. 5, the operation of the global clock distribution circuit 2 is explained.

As the global clock distribution circuit 2 has a constitution that the clock buffer couples 3-m constituted by the same clock buffers 30-m, 31-m are connected by the global clock line 100 which are laid out in parallel, the propagation delays of the global clock signals between the optional two clock buffer couples are the same.

For example, the delays of propagation between the clock buffer couples 3-1 and 3-(l+1) are equal irrespective of the direction thereof, and the delay of propagation is assumed to be T1. Similarly, it is assumed that the propagation delay between the clock buffer couples 3-(l−1) and 3-1 is assumed to be T2, the propagation delay between the clock buffer couples 3-i and 3-(i+1) to be Ti, the propagation delay between the clock buffer couples 3-(i−1) and 3-i to be T(i+1), the propagation delay between the clock buffer couples 3-2 and 3-3 to be T(n−1) and the propagation delay between the clock buffer couples 3-1 and 3-2 to be Tn.

At this time, the propagation delays from the two input terminals 2a, 2b of the clock propagation circuits constituting the global clock distribution circuit 2 to the respective output terminals 2c, 2d are equal, and are represented by T=T1+T2+ . . . +Ti+T(i+1)+ . . . +T(n−1)+Tn.

FIG. 5 is a timing chart in the case where the o'clock of the rising up transition of the global signal inputted from the global clock forming circuit 1 to the input terminals 2a, 2b is assumed to be T0. Assuming the o'clock at which the clock signals which showed a rising transition at T0 in the input terminals 2a, 2b are distributed in reverse direction to each other by the global clock distribution circuit 2 and arrive at the clock driver couple 3-(l+1) as the clock signals C1, C2, to be Ta1, Tb1, respectively,
the relations are:

Ta1=T0

Tb1=T0+T1+T2+ . . . +Ti+T(i+1)+ . . . +T(n−1)+Tn.

Accordingly, the intermediate o'clock Tm1 of the distributed two clock signals C1, C2 becomes:

Tm1=(|Ta1+Tb1|)/2

=[2T0+T1+T2+ . . . +Ti+T(i+1)+. . . +T(n−1)+Tn]/2

=T0+T/2.

Similarly, assuming the o'clock at which the clock signals which showed rising transition at T0 at the input terminals 2a, 2b in a certain clock driver couple 3-i arrive as the clock signals C1, C2 by the global clock distribution circuit 2 to be Tai, Tbi, the relations are:

Tai=T0+T1+T2+ . . . +Ti

Tbi=T0+Tn+T(n−1)+ . . . +T(i+1).

Accordingly, the intermediate o'clock Tmi of these two clock signals C1, C2 become:

Tmi=(|Tai+Tbi|)/2

=[2T0+T1+T2+ . . . +T(n−1)+Tn]/2

=T0+T/2.

Namely, in any clock buffer couple 3-m, the intermediate o'clock of the two clock signals C1, C2 to be distributed in reverse direction to each other by the global clock distribution circuit 2 is constant at T0+T/2. This property is satisfied without respect to the propagation delay amount or the layout disposition relations of the clock buffer couple 3-m, or device characteristic, provided that the clock buffer couple 3-m is constituted by the same clock driver and the two global clock line 100 connecting between the clock buffer couples 3-m are to be laid out in parallel, and assuming that the propagation delays of the clock signals between the two clock drivers constituting the global clock distribution circuit 2 are the same without respect to the propagation direction thereof.

Figure 6:
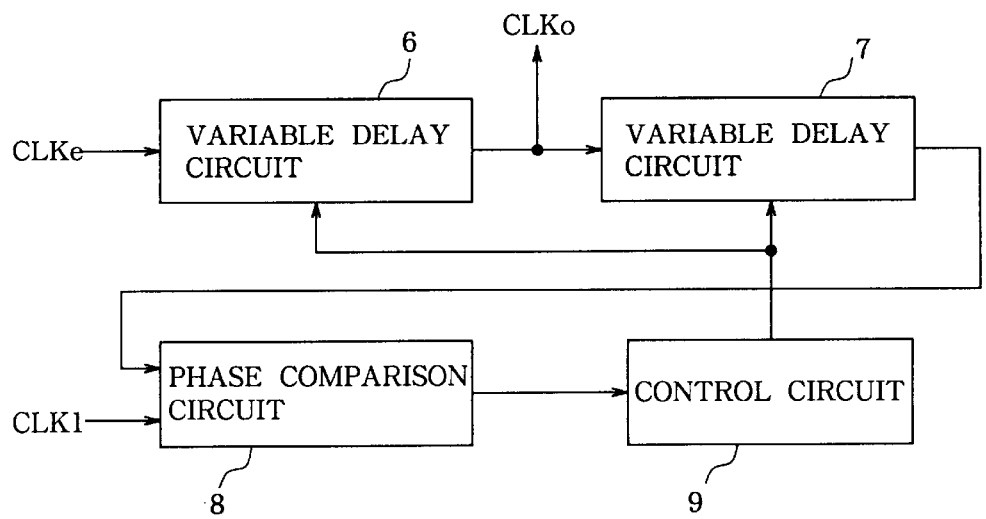
FIG. 6 is a block diagram showing a constitution example of the local clock generating circuit of FIG. 3.

FIG. 6 is a block diagram showing the constitution example of the local clock generating circuit 4-m of FIG. 3. The local clock generating circuit 4-m is constituted by the two variable delay circuits 6, 7, a phase comparison circuit 8, and a control circuit 9.

The local clock generating circuit 4-m dynamically forms by the above clock signals C1, C1 the local clock signal on the basis of the intermediate o'clock of the transitions of the clock signals C1, C2.

The two variable delay circuits 6, 7 employ the clock signals inputted to the input CLKe as the inputs and are connected in series to each other. The phase comparison circuit 8 detects the phase difference between the output of the variable delay circuit 7 and the clock signal to be inputted to the input CLK1. The control circuit 9 controls the delay amounts of the variable delay circuits 6, 7 according to the output of the phase comparison circuit 8. A delay-locked loop is formed by these variable delay circuits 6, 7, phase comparison circuit 8, and control circuit 9.

The output of the variable delay circuit 6 lying in the preceding step of the series connected two variable delay circuits 6, 7 is assumed to be CLKo. In the input CLKe there is inputted the one having an advanced phase out of the two clock signals C1, C2 which are distributed by the global clock distribution circuit 2, and in the input CLK1 the one having a delay in phase, respectively.

The two series connected variable delay circuits 6, 7 delay the clock signals inputted in the input CLKe. The phase comparison circuit 8 effects the phase comparison between the delayed clock signal and the clock signal inputted to the input CLK1, and outputs the result of said comparison to the control circuit 9.

Based on the comparison result of the phase comparison circuit 8, the control circuit 9 changes the delay amounts of the two variable delay circuits 6, 7 so as not to provide the phase difference of the two clock signals to be inputted to the phase comparison circuit 8. Under the condition where the phase difference of the two inputs in the phase comparison circuit 8 becomes zero, the two variable delay circuits 6, 7 have the same delay amounts, so that there is obtained in the output CLKo the signal which transmits at the intermediate clock of the transition clock of the clock signals inputted in the input CLKe and the input CLK1. Namely, the clock signal having the intermediate phase of the respective phases of the two clock signals C1, C2 distributed by the global clock distribution circuit 2 is outputted to the output CLKo.

For example, assuming the phase of the clock signal to be inputted to the input CLKe to be $\phi 1$, the phase of the clock signal to be inputted to the CLK1 to be $\phi 2=\phi 1+\Delta\phi$, and the delay amount of the variable delay circuits 6, 7 to be X, when the phase difference between the two clock signals to be inputted to the phase comparison circuit 8 becomes zero, the following expression can be formed:

$\phi 1+2\cdot X=\phi 2$ $=\phi 1+\Delta\phi$.

At this time, the relation is $X=\Delta\phi/2$, and to the output CLKo there is outputted a clock signal having the intermediate phase ($\phi 1+\Delta\phi/2$) of the clock signals C1, C2 to be inputted to the inputs CLKe and the inputs CLK1. This does not depend on the size of the phase difference $\Delta\phi$ between the clock signals C1 and C2. In other words, it becomes possible for the local clock generating circuit 4-m to form the clock signal of the same phase in all local clock generating circuits 4-m, without respect to the position of the connection to the global clock distribution circuit 2.

Figure 7:
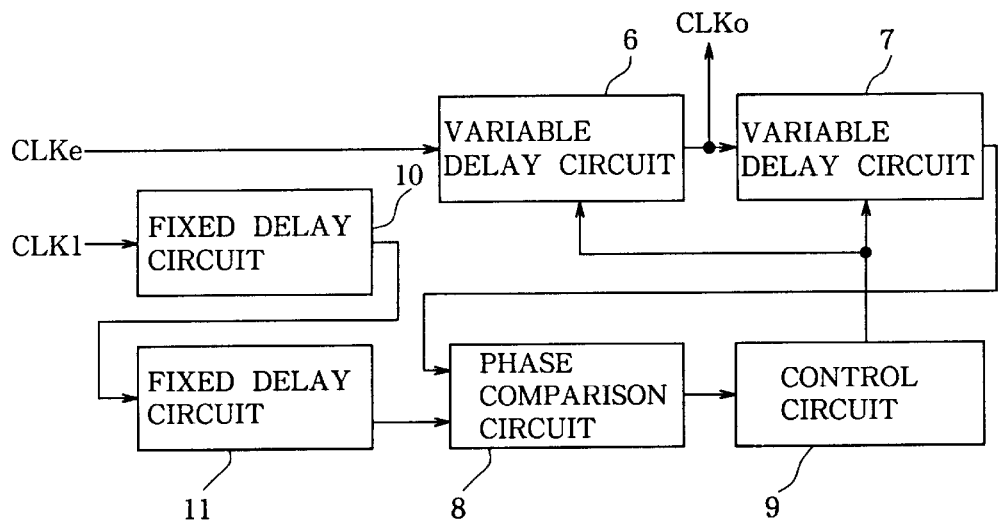
FIG. 7 is a block diagram showing another constitution example of the local clock generating circuit of FIG. 3.

FIG. 7 is a block diagram showing other constitution example of the local clock generating circuit 4-m of FIG. 3. In the other constitution example of the local clock generating circuit 4-m, except the provision of the two fixed delay circuits 10, 11, the constitution is similar to that shown in FIG. 6, and the same marks are assigned to the same constituting elements.

In other constituting example of the local clock generating circuit 4-m, in the local clock generating circuit 4-m as shown in FIG. 6, input is made to the phase comparison circuit 8 through the fixed delay circuits 10, 11 made by connecting in series the two clock signals to be inputted to the input CLK1. The two fixed delay circuits 10, 11 make the delay amounts of the fixed delay circuits 10, 11 same as the minimum delay amounts of the variable delay circuits 6, 7 when the minimum delay amounts of the variable delay circuits 6, 7 are not zero, thereby compensating the minimum delay.

For example, in order to make it possible to connect the local clock generating circuit 4-m to an optional position of the global clock distribution circuit 2 when the delay time from the input terminals 2a, 2b to the output terminals 2c, 2d of the global clock distribution circuit 2, because the phase difference $\Delta\phi$ of the two clock signals C1, C2 inputted by the local clock generating circuit 4-m can take the range of $0 \leq \Delta\phi \leq T$, in the local clock generating circuit 4-m as shown in FIG. 6, the delay amount X of the variable delay circuits 6, 7 is required to be in the range of $0 \leq X \leq T/2$, from the above illustration.

In other constitution example of the local clock generating circuit 4-m, when the delay amount X of the variable delay circuits 6, 7 is $X0 \leq X \leq T/2$, by making the delay amount of the fixed delay circuits 10, 11 X0, it becomes possible to connect the local clock generating circuit 4-m to an optional position of the global clock distribution circuit 2.

For example, when the phase of the clock signal to be inputted to the input CLKe is set to be $\Delta\phi 1$, the phase of the clock signal to be inputted to the input CLK1 to be $\phi 2 = \phi 1 + \Delta\phi$, and the delay amount of the variable delay circuits 6, 7 to be X, when the phase difference of the two clock signals inputted to the phase comparison circuit 8 becomes zero, the following expressions are satisfied:

$$\phi 1 + 2 \cdot X = \phi 2 + 2 \cdot X0$$

$$= \phi 1 + \Delta\phi + 2 \cdot X0$$

At this time, $X = \Delta\phi/2 + X0$, and to the output CLKo, a clock signal having a phase $\phi 1 + \Delta\phi/2 + X0$ which is delayed by X0 from the intermediate phase $\phi 1 + \Delta\phi/2$ of the clock signals C1, C2 inputted to the input CLKe and the input CLK1, is outputted. Namely, by compensating the fixed delay X0 with the whole local clock generating circuits 4-m connected to the global clock distribution circuit 2, it becomes possible to form the clock signal of the same phase without depending on the position to connect with the global clock distribution circuit 2. In this case, it may be allowable if the delay amount X of the variable delay circuits 6, 7 can be in the range of $X0 \leq X \leq T/2$.

Figure 8:
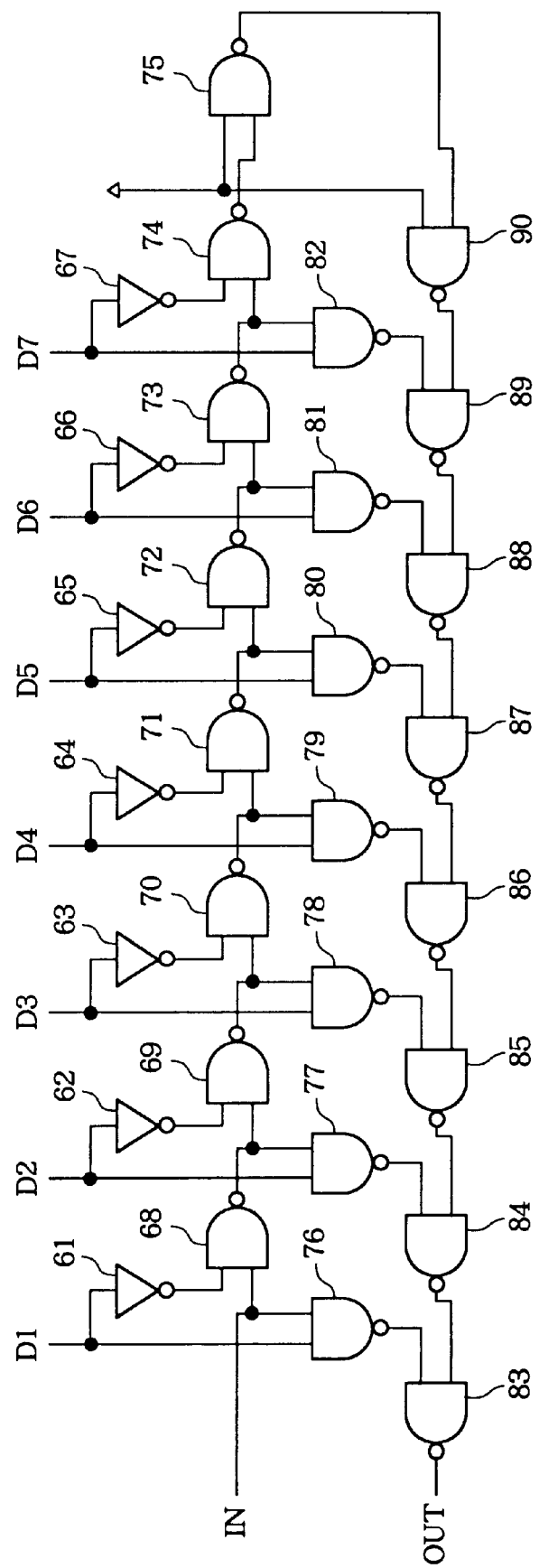
FIG. 8 is a view showing a constitution example of the variable delay circuit of FIG. 6.

FIG. 8 is a view showing a constitution example of the variable delay circuit 6 of FIG. 6. In the drawing, the variable delay circuit 6 is constituted by the inverters 61–67 and the NAND (negation logical product) gates 68–90. The variable delay circuit 7 also has the same constitution as the variable delay circuit 6.

In the variable delay circuit 6, the signals inputted from the input IN are delayed by the NAND gates 68–90 and outputted from the output OUT. To the inputs D1–D7, the signals for controlling the variable delay circuit 6 are inputted.

When all the signals to be inputted to the inputs D1–D7 are "1", the variable delay circuit 6 provides the minimum delay. Assuming the delay amount of the NAND gates 68–90 to be d, the signals inputted from the input IN pass through the NAND gates 76, 83 and are outputted to the output OUT, and their delay is $2d$.

Assuming the signal to be inputted to the input D1 to be "0", and the signal to be inputted to the inputs D2–D7 to be "1", the signal inputted from the input IN passes through the NAND gates 68, 77, 84, 83 and is outputted to the output OUT. The delay in this case is $4d$.

In the same manner, when all the signals to be inputted to the inputs D1–D7 are set to be "0", the delay time from the input IN to the output OUT becomes $16d$. Namely, depending on the amount of the signal to be inputted to the inputs D1–D7, delays in the unit of $2d$ from $2d$ to $16d$ can be offered. The control circuit 9 carries out control of the delay amount of the variable delay circuit 6 by controlling the signals to be inputted to the inputs D1–D7. Also, the control circuit 9 effects control of the delay amount of the variable delay circuit 7 in the same manner as above.

Figure 9:
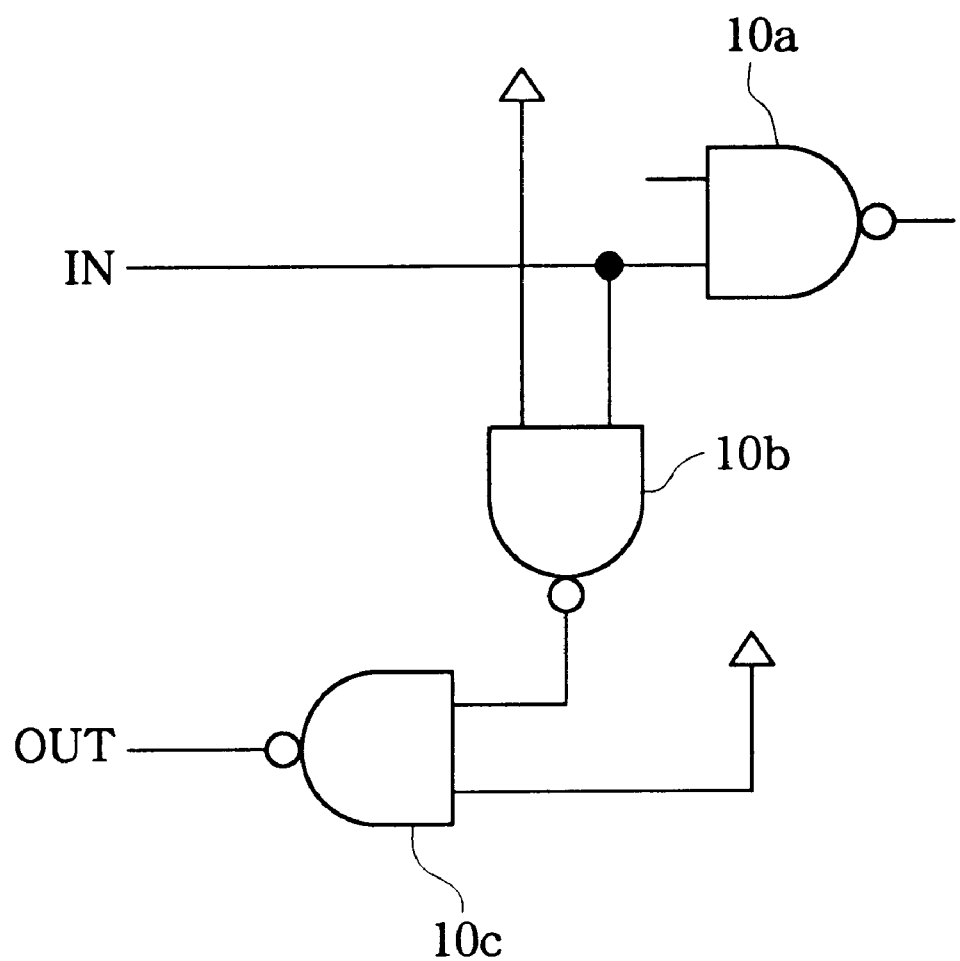
FIG. 9 is a view showing a constitution example of the fixed delay circuit of FIG. 7.

FIG. 9 is a view to show the constitution example of the fixed delay circuit 10 of FIG. 7. In the figure, the fixed delay circuit 10 is constituted by the NAND gates 10a–10c. The fixed delay circuit 11 has the same constitution as that of the fixed delay circuit 10.

For NAND gates 10a–10C constituting the fixed circuit 10, by using the same NAND gates as the NAND gates 68–90 of the above variable delay circuit 6, the minimum delay $2d$ of the variable delay circuit 6 is provided.

In FIG. 3, the local clock distribution circuit 5-m distributes in the circuit block the local clock signal which is formed by the above local clock generating circuit 4-m and outputted to the output CLKo.

Figure 10:
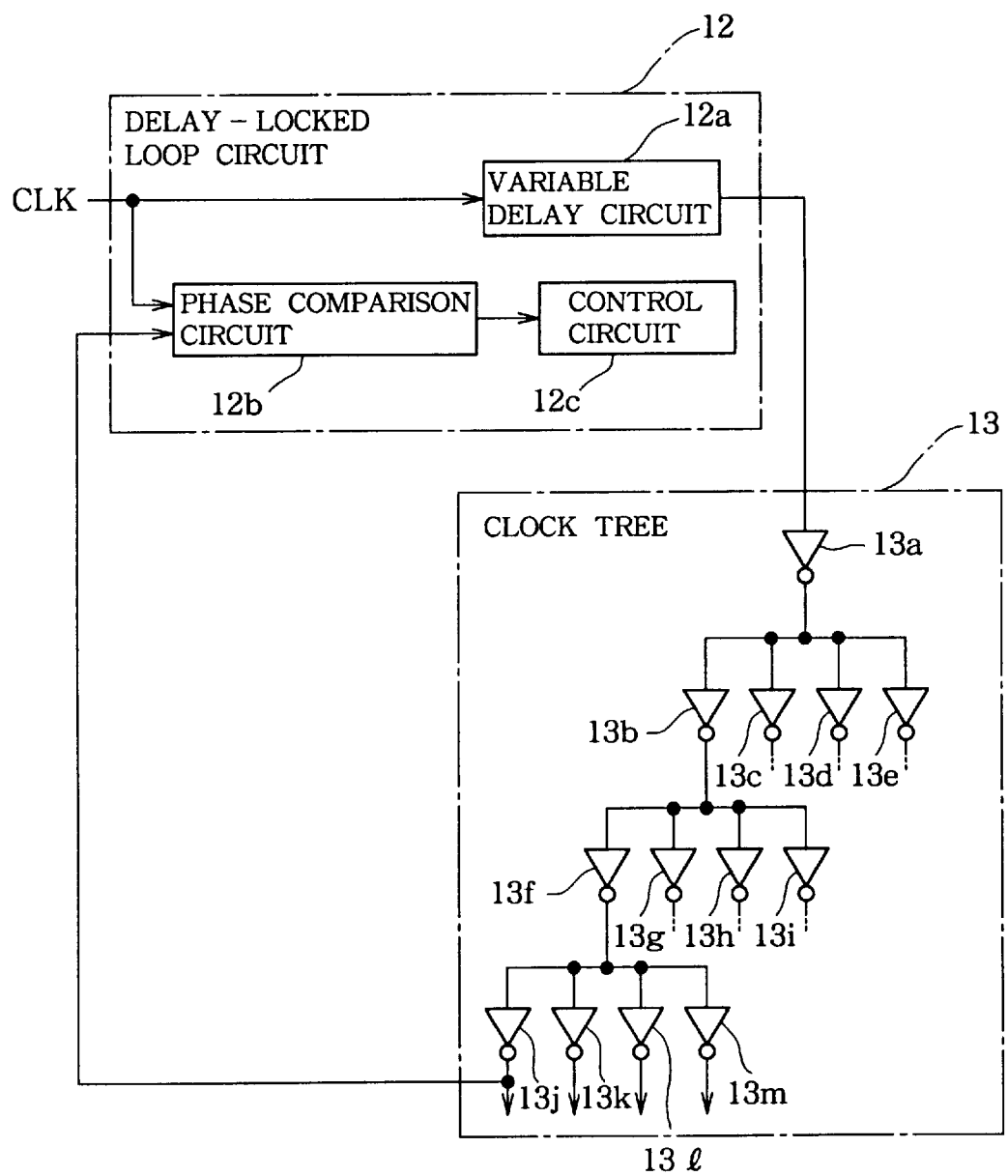
FIG. 10 is a view showing a constitution example of the local clock distribution circuit of FIG. 3.

FIG. 10 is a view to show the constitution example of the local clock distribution circuit 5-m of FIG. 3. In the figure, the local clock distribution circuit 5-m is constituted by the delay-locked loop circuit 12 and the clock tree 13, and by connecting the output of the delay-locked loop circuit 12 to the input of the clock tree 13, and the output of the clock tree 13 to the input of the delay-locked loop circuit 12, a loop is formed.

The delay-locked loop circuit 12 is constituted by the variable delay circuit 12a, phase comparison circuit 12b, and control circuit 12c. The clock tree 13 is constituted by the plural clock buffers 13a–13m.

The phase comparison circuit 12b compares the phase of the output clock signal of the local clock generating circuit 4-m inputted from the input CLK with the phase of the clock signal at the end of the clock tree 13, and outputs the result thereof to the control circuit 12c. The control circuit 12c adjusts the delay amount of the variable delay circuit 12a so as to make the phase difference between the clock signal and the clock signal at the end of the clock tree 13 inputted from the input CLK zero, based on the output of the phase comparison circuit 12b.

The clock tree 13 may suffice with distributing the clock signal only to the nearby region in the circuit block, so that, different from the time of carrying out clock distribution with the clock tree to the whole LSI, it can be expected to make it possible to distribute the clock with the skew between the clock tree ends reduced to sufficiently small level.

In case that there is no difference in the scales of the clock tree 13 which constitutes each local clock distribution route 5-m, and that the delay difference thereof is in the allowable range, the delay-locked loop circuit 12 may be omitted.

The connecting position of the local clock generating circuit 4-m to the global clock distribution circuit 5-m is optional. In FIG. 3, the local clock generating circuit 4-m is connected to the input side of the clock buffer couple 3-m, but the position may be on the output side of the clock buffer couple 3-m, or, when the distance between the clock buffer couples 3-m is sufficiently small and the delay difference by the position on global clock line 100 can be neglected, the line may be between the clock buffer couples 3-m.

The number of the local clock distribution circuit 5-m is also optional. Accordingly, it is possible to make the region that the local clock generating circuit and the local distribution circuit distribute the local clock to sufficiently small.

Furthermore, because of the detection of the phase difference between the clock signals C1 and C2 and dynamic clock formation, the device deviation between the circuit blocks, temperature fluctuation, and power supply voltage fluctuation can be compensated.

Though the layout distance between the clock buffer couples 3-m which constitute the global clock distribution circuit 2 is optional, provided that the line resistances and line capacities of all the global clock line 100 are made the same and all the delays between the clock buffer couples 3-m are made the same by making the layout distances of all the clock buffer couples 3-m same, the device deviation, temperature fluctuation, and power supply voltage fluctuation, etc. between the clock buffer couples 3-m can also be compensated.

Namely, in FIG. 4, assuming the delay between the clock buffer couples 3-m to be $Tp=T1=T2=\ldots=Tn$, the phases of the two clock signals C1, C2 to be inputted by the local clock generating circuit 4-i connected to the i-th clock buffer couple 3-i are delayed by $(i-1) \cdot Tp$ and $(n-i+1) \cdot Tp$ from the input terminals 2a, 2b of the global clock distribution circuit 2.

Now, assuming that the effects of the device deviation, temperature fluctuation, and power supply voltage fluctuation, etc. are exerted to the clock buffer couple and the delay time up to the clock buffer couples adjacent to both sides becomes $Tp+\Delta t$, the phase delays from the input terminals 2a, 2b of the above clock signals C1, C2 become $(i-1) \cdot Tp+\Delta t$ and $(n-i+1) \cdot Tp$ or $(i-1) \cdot Tp$ and $(n-i+1) \cdot Tp+\Delta t$. In other words, the clock signal having an intermediate phase of the phase of the clock signals C1, C2 has a phase delay of $(n \cdot Tp+\Delta t)/2$ from the input terminals 2a, 2b, which is constant without depending on the connection position of the local clock generating circuit 4-m.

Accordingly, even if, under effect of the device deviation or temperature fluctuation, and power supply voltage fluctuation, etc., displacement occurs in the characteristics of certain clock buffer couple, it becomes possible to compensate such displacement so that each local clock generating circuit 4-m can form the local clock signal of the same phase. This means that the different sized clock buffers or different power supply voltages can be used intentionally between the clock buffer couples 3-m, and in the same manner, each local clock generating circuit 4-m can form the local clock signals of the same phase.

As apparent from the above explanation, by the present invention it is possible to compensate the effects such as the device deviation or temperature fluctuation, and power supply voltage fluctuation, etc. In the global clock distribution circuit 5-m, a plurality of clock buffer couples 3-m are inserted, and as the line between the clock butter couples 3-m are sufficiently short, it becomes possible to make clock distribution with less tendency to have the effects of the inter-line coupling or noise and high speed. As a result, it becomes possible to distribute low skew and high speed clock signal to the whole LSI.

Figure 11:
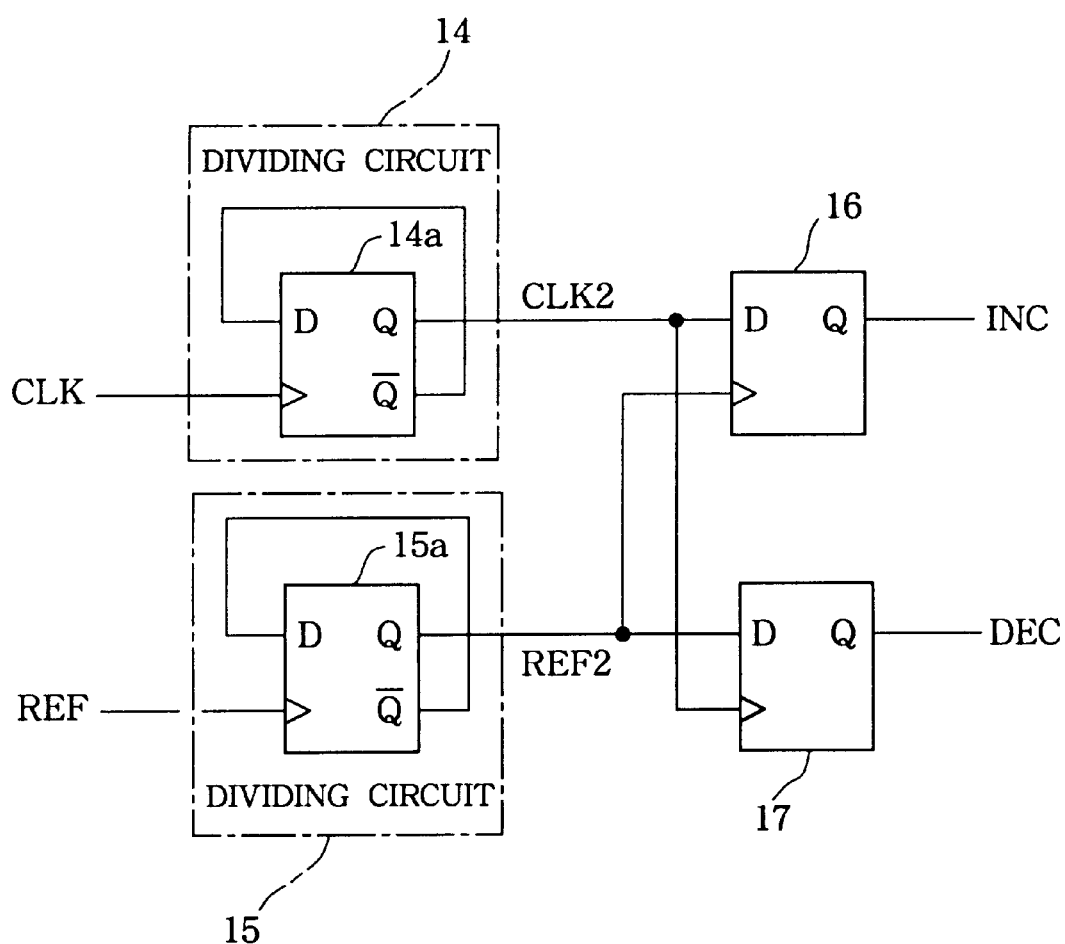
FIG. 11 is a view showing a constitution example of the phase comparison circuit of FIG. 6.

FIG. 11 is a view showing the constitution example of the phase comparison circuit 8 of FIG. 6. In the figure, the phase comparison circuit 8 is constituted by the two dividing circuits 14, 15 and the two D flip-flops 16, 17. The clock signals to be inputted to the input CLK are inputted to the D input of the flip-flop 16 and the clock input of the flip-flop 17, respectively, through the dividing circuit 14, and the clock signals to be inputted to the input REF are inputted to the D input of the flip-flop 17 and the clock input of the flip-flop 16, respectively, through the dividing circuit 15. The dividing circuits 14, 15 divide the input signal into 2 parts by feeding back the negation outputs of the flip-flops 14a, 15a to the input.

Figure 12:
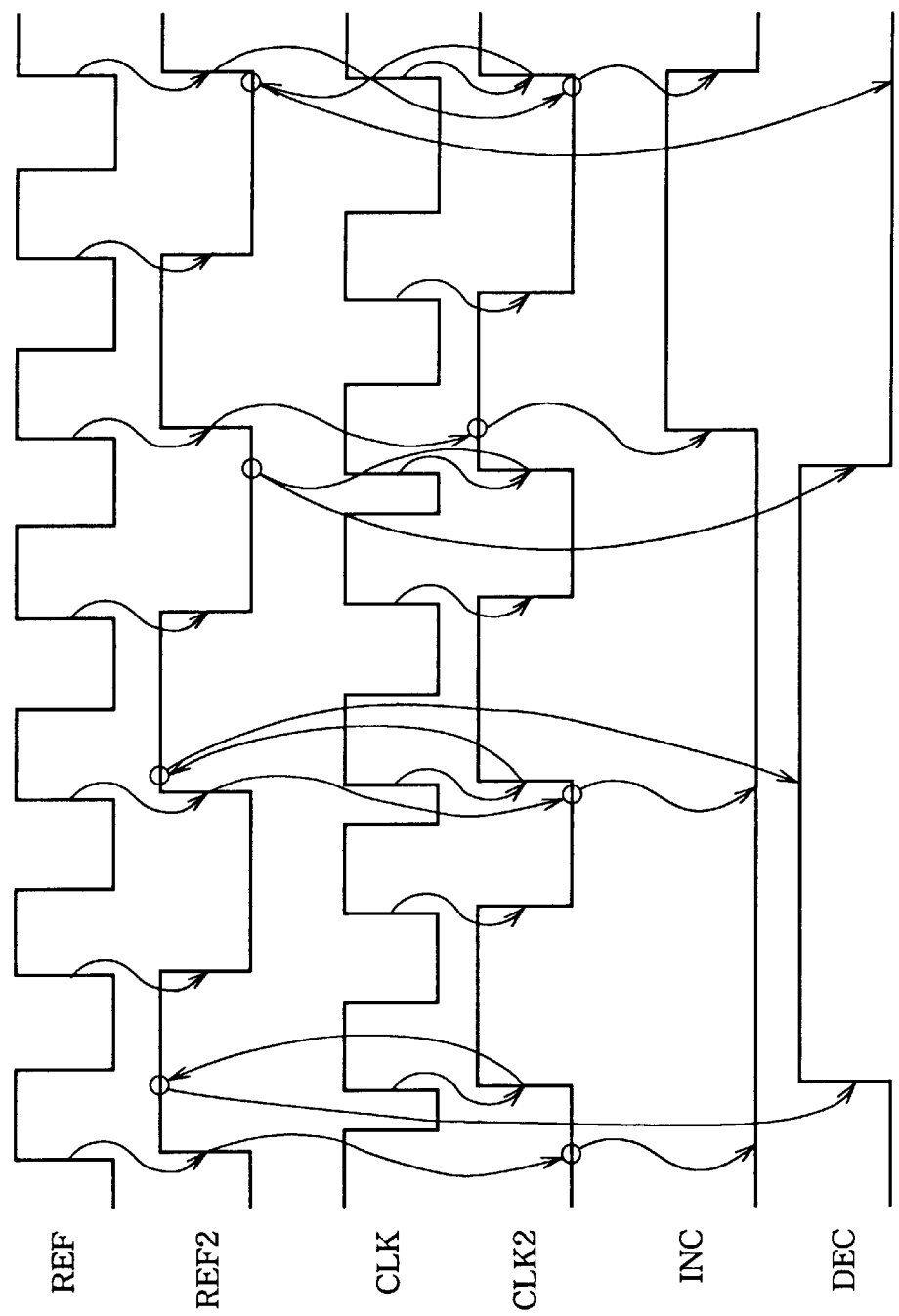
FIG. 12 is a timing chart showing the operation of the phase comparison circuit of FIG. 6.

FIG. 12 is a timing chart which shows the operation of the phase comparison circuit 8 of FIG. 6. Referring to these FIG. 11 and FIG. 12, the operation of the phase comparison circuit 8 is explained. The clock signal inputted from the input REF is divided into 2 parts by the dividing circuit 15. Similarly, the clock signal inputted from the input CLK is divided into 2 parts by the dividing circuit 14.

Assuming the signal obtained by dividing the output of the division circuit 14, i.e., the clock signal inputted from the input CLK, to be CLK2, and the signal obtained by dividing the output of the division circuit 15, i.e., the clock signal inputted from the input REF, to be REF2, the CLK2 is latched in the rising timing of REF2 by the flip-flop 16, and outputted from the output INC.

REF2 is latched by the D flip-flop 17 in the rising timing of CLK2, and outputted from the output DEC. In other words, it the phase of the clock signal inputted from the input REF is more advanced than that of the clock signal inputted from the input CLK, the output INC becomes "0" and the output DEC becomes "1". Inversely, if the phase of the clock signal inputted from the input CLK is more advanced than that of the clock signal inputted from REF, the output INC becomes "1", and DEC becomes "0".

In the local clock generating circuit 4-m shown in FIG. 6, the clock signal inputted from the input CLKe and which passed through the two variable delay circuits 6, 7 is connected to the input CLK of the phase comparison circuit 8, and the input CLK1 is connected to the input REF, and if in the control circuit 9 if the output INC of the phase comparison circuit 8 is "1", the delay of the variable delay circuits 6, 7 is increased, and if the output DEC of the phase comparison circuit 8 is "1", the delay of the variable delay circuits 6, 7 is decreased, by which the local clock generating circuit 4-m realizes the desired operation as described above.

The divided circuits 14, 15 of the phase comparison circuit 8 causes to increase the maximum amount of the detectable phase difference. That is to say, by dividing the clock signal inputted from the input CLK and the clock signal inputted from the input REF into 2 parts, the maximum phase difference detectable of the clock signals inputted from the input CLK and the input REF increases from Tc/2 to Tc, assuming the cycle time thereof to be Tc.

When further division is made for example to division n, the maximum phase difference that can be detected becomes (Tc/2)·n. That is to say, if the number of division is increased, the detectable maximum phase difference increases, so that there is no limitation to the phase difference of the two clock signals to be inputted to the local clock generating circuit 4-m from the global clock distribution circuit 5-m. This means that there is no limitation to the maximum amount of the delay time from the input ends 2a, 2b of the global clock distribution circuit 2 to the output ends 2c, 2d.

Accordingly, as it is possible to insert the clock buffer couple 3-m in the global clock distribution circuit 5-m at an adequate interval, the effects of coupling and noise can be curtailed. Also, the freedom of the shape of the global clock distribution circuit 2 is improved, and for example it becomes easy to deform the said circuit to the desired shape so as to meet for example the layout condition of other circuit on LSI.

Instead of dividing the clock signals inputted from the input CLK and the input REF by the dividing circuits 14, 15, the pulse selection circuits for selecting the pulse of the clock signals inputted from the input CLK and the input REF may be connected to the input CLK and input REF so that the corresponding pulses only are allowed to pass by the input CLK and the input REF, by which similarly the detectable maximum phase difference can be increased.

Figure 13:
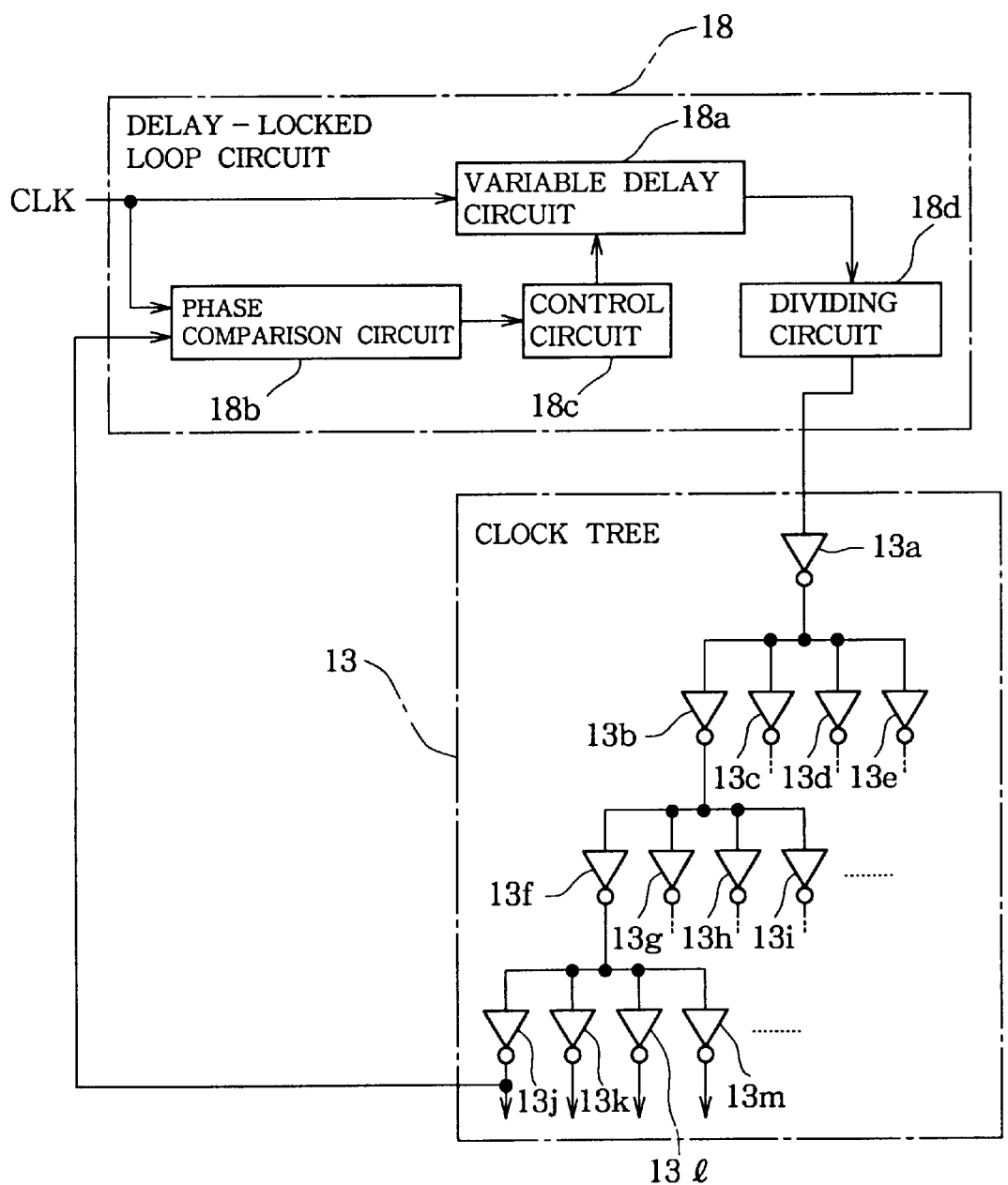
FIG. 13 is a view showing another constitution example of the local clock distribution circuit of FIG. 3.

FIG. 13 is a view showing other constitution example of the local clock distribution circuit 5-m of FIG. 3. In the figure, the local clock distribution circuit 5-m is constituted by a delay-locked loop circuit 18 and a clock tree 13, in which the output of the delay-locked loop circuit 18 is connected to the input of the clock tree 13, and the output of the clock tree 13 to the input of the delay-locked loop circuit 18 to form a loop.

According to the other constitution example of this local clock distribution circuit 5-m, except that in the delay-locked loop circuit 18 a dividing circuit 18d is connected to the output of the delay-locked loop circuit 12 shown in FIG. 10, the constitution is the same as that of the delay-locked loop circuit 12 shown in FIG. 8.

The dividing circuit 18d divides the global clock signal inputted to the input CLK and delayed in the variable delay circuit 18a and outputs it as a local clock signal to the clock tree 13. By this dividing circuit 18d, the clock signal having a frequency lower than the frequency of the global clock signal distributed in the global clock distribution circuit 2 can be distributed in the same phase as the global clock signal.

Figure 14:
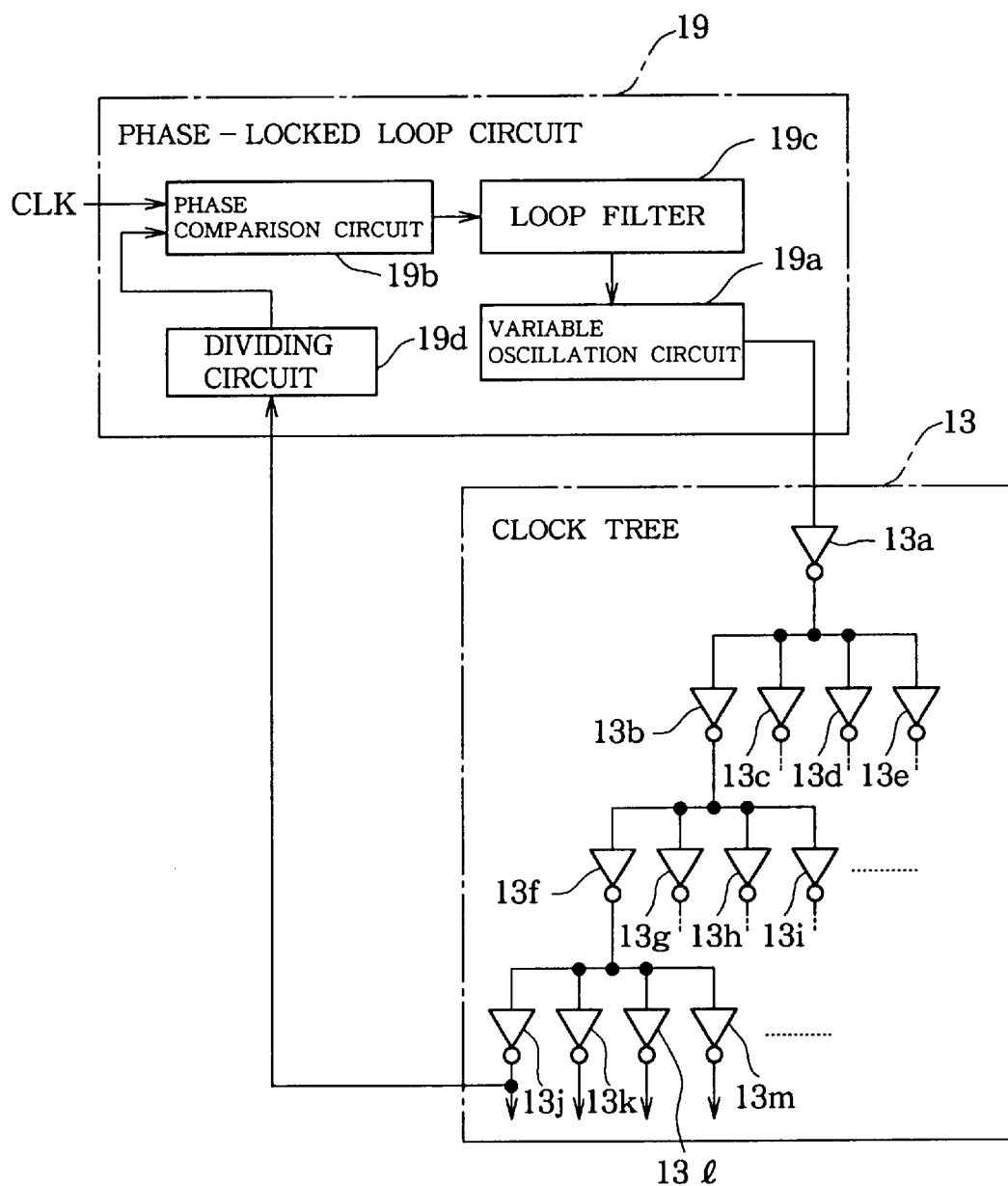
FIG. 14 is a view showing other constitution example of the local clock distribution circuit of FIG. 3.

FIG. 14 is a view showing another constitution example of the local clock distribution circuit 5-m of FIG. 3. In the figure, the local clock distribution circuit 5-m is constituted by a phase-locked loop circuit 19 and a clock tree 13, wherein a loop is formed by connecting the output of the phase-locked loop circuit 19 to the input of the clock tree 13, and the output of the clock tree 13 to the input of the phase-locked loop circuit 19.

According to the other constitution example of this local clock distribution circuit 5-m, in the phase-locked loop circuit 19, instead of the delay-locked loop circuit 12 shown in FIG. 8, a phase-locked loop circuit 19 is used. The phase-locked loop circuit 19 is constituted by a variable oscillation circuit 19a, a phase comparison circuit 19b, a loop filter 19c, and a dividing circuit 19d.

In the variable oscillation circuit 19a, the oscillation frequency is determined by the output of the phase comparison circuit 19b which is filtered by the loop filter 19c, and its output is distributed to the inside of the circuit block through the clock tree 13. The dividing circuit 19d divides the clock signal at the end of the clock tree 13 and inputs it to the phase comparison circuit 19b.

The phase comparison circuit 19b compares the phases between the clock signal inputted from the input CLK and the clock signal fed back from the clock tree 13 and divided by the dividing circuit 19d, and outputs the comparison result to the variable oscillation circuit 19a through the loop filter 19c to control the oscillation frequency thereof. By this step, the phase and frequency between the clock signal inputted from the input CLK and the clock signal fed back from the clock tree 13 and divided by the dividing circuit 19d are adjusted.

By dividing the feed back signal from the clock tree 13 in the dividing circuit 19d, the local clock signal having the same phase and high frequency as the global clock signal inputted from the input CLK can be distributed in the circuit block. Accordingly, as the global clock signal can lower the frequency, it becomes possible to curtail the power consumption for the distribution of the global clock signal.

Figure 15:
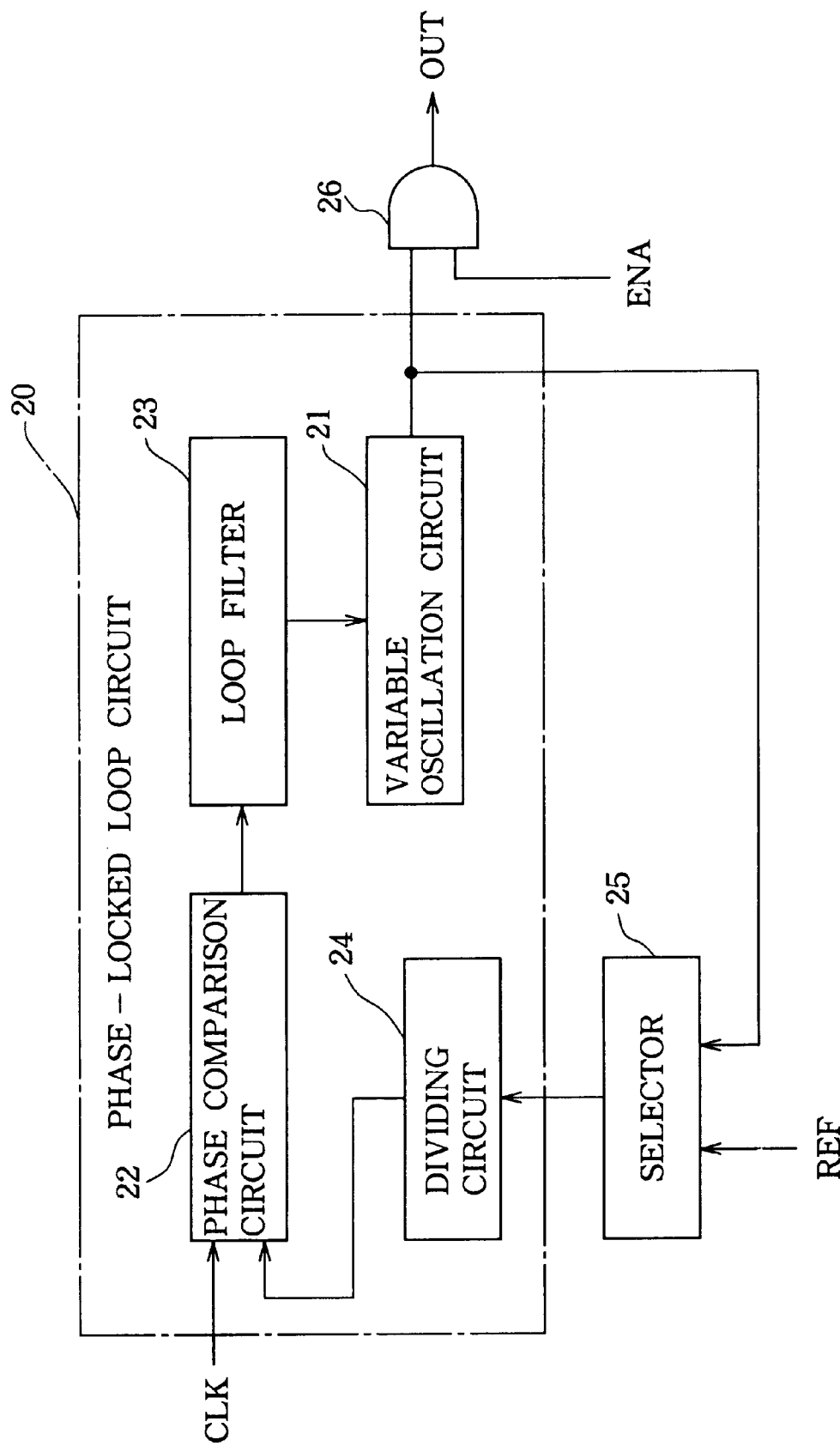
FIG. 15 is a view showing the constitution example of the global clock forming circuit of FIG. 3.

FIG. 15 is a view showing the constitution example of the global clock forming circuit 1 of FIG. 3. In the figure, the global clock forming circuit 1 is constituted by a phase-locked loop circuit 20, a selector 25, and an AND (logical product) gate 26, and the phase-locked loop circuit 20 is constituted by a variable oscillation circuit 21, a phase comparison circuit 22, a loop filter 23, and a dividing circuit 24.

In this global clock forming circuit 1, the frequency, the reference clock signal from outside the LSI inputted to the input CLK through the phase-locked loop circuit 20 is multiplied, and the clock signals are outputted from the output OUT to the global clock distribution circuit 2 through the AND gate 26.

The AND gate 26 prevents the erroneous operation of each local clock generating circuit 4-m and local clock distribution circuit 5-m by preventing its output from being outputted to OUT by the input ENA until the phase-locked loop circuit 20 is locked. The selector 25 feeds back the output of the variable oscillation circuit 21 to the dividing circuit 24 in the initial condition.

When the phase-locked loop circuit 20 is locked and the output to the global clock distribution circuit 2 is started, the selector 25 feeds back to the dividing circuit 24 the output in the vicinity of the local clock generating circuit 4-m inputted to the input REF, thereby making it possible to effect phase matching between the external clock signal and the clock signal distributed inside the LSI.

As described above, in the present invention, the global clock signal is distributed to each circuit block by the global clock distribution circuit 2. Each circuit block forms a local clock signal in the local clock generating circuit 4-m. The local clock signal is distributed in the circuit block by the local clock distribution circuit 5-m. This means that the design of the local clock forming and distribution circuit can be carried out by each circuit block without depending on other circuit block, and it becomes possible to curtail the design cost.

Also, it is possible to carry out easily the clock control such as the frequency control or clock stopping in the unit of each circuit block. Furthermore, as the phase matching is dynamically performed in the phase-locked loop circuit or delay-locked loop circuit, the clock signals of the different frequencies can be selected by each circuit block, and the power supply voltage may be different in the respective circuit block.

Figure 16:
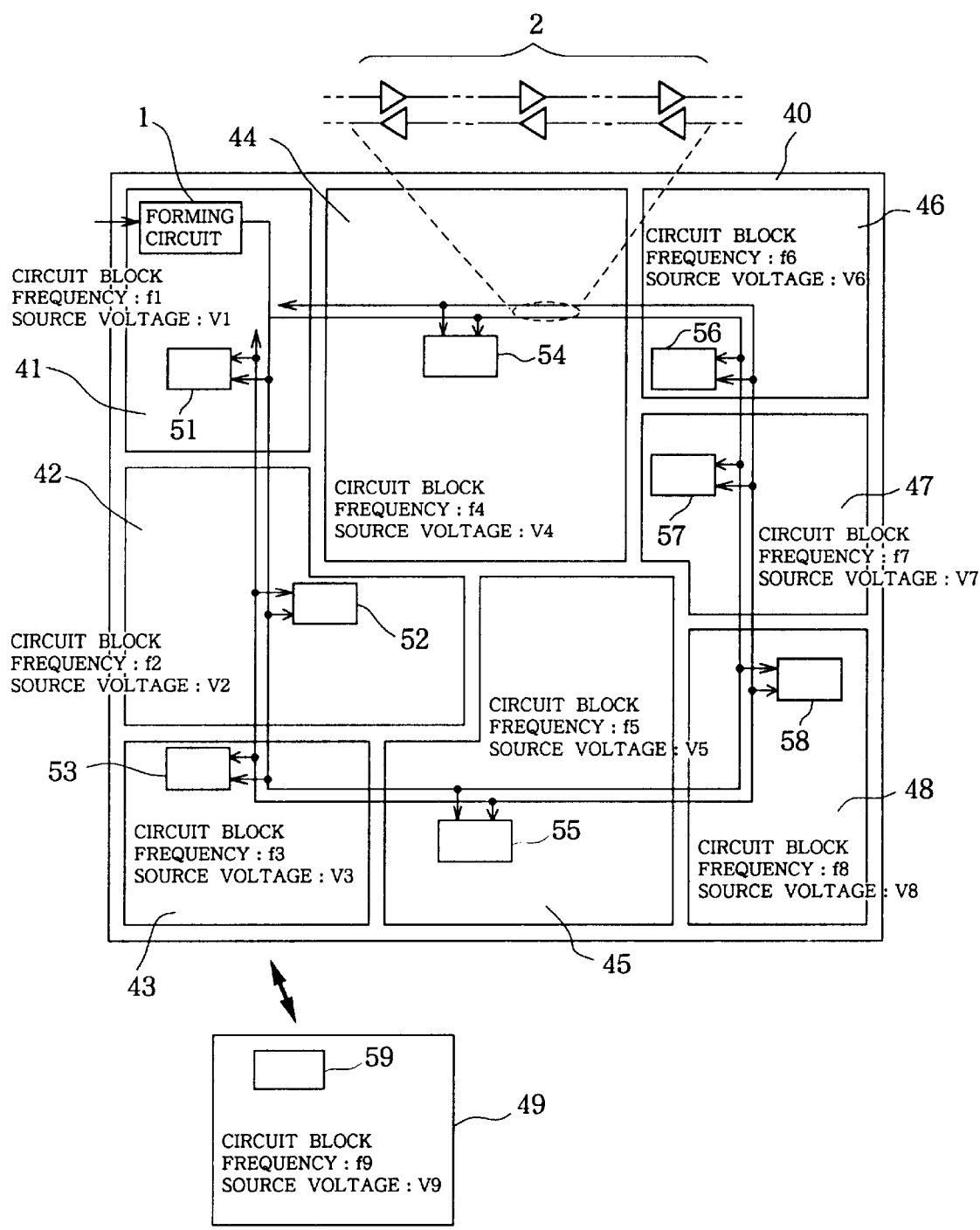
FIG. 16 is a view showing a constitution example of LSI to which the present invention is applied.

FIG. 16 is a view showing a constitution example of the LSI to which the present invention is applied. In the figure, LSI 40 is constituted by the circuit blocks 41–48, of which the circuit block 41 has a clock frequency of f1, and a power supply voltage of V1, the circuit block 42 has a clock frequency of f2 and a power supply voltage of V2, the circuit block 43 has a clock frequency of f3 and a power supply voltage of V3, and the circuit block 44 has a clock frequency of f4 and a power supply voltage of V4.

The circuit block 45 has a clock frequency of f5, and a power supply voltage of V5, the circuit block 46 has a clock frequency of f6 and a power supply voltage of V6, the circuit block 47 has a clock frequency of f7 and a power supply voltage of V7, and the circuit block 48 has a clock frequency of f8 and a power supply voltage of V8.

The circuit blocks 41 to 48 are provided with the local clock forming and distribution circuits 51 to 58. By the local clock forming and distribution circuits 51 to 58 appropriate clock frequency and power supply voltage are selected in the circuit blocks 41 to 48.

In general, the power consumption P in the LSI circuit, assuming the clock frequency to be f, power supply voltage to be V, and load capacity to be C, is expressed by:

$$P = 1/2 \cdot f \cdot C \cdot V \cdot V$$

That is to say, to select the pertinent clock frequency and power supply voltage for the circuit blocks 41 to 48 is effective for curtailing the power consumption.

Also, as it is possible to carry out the designing of the local clock forming and distribution circuits 51 to 58 independently in the circuit blocks 41 to 48, as shown in FIG. 16, replacement between the circuit block 43 and the circuit block 49 or re-designing of the circuit blocks 41 to 48 can be performed without requiring re-designing of the local clock forming and distribution circuits or the global clock forming and distribution circuits of other circuit blocks.

As a result, it becomes possible to facilitate module formation or library formation of the circuit blocks 41 to 48, improve the re-utilization property of the circuit blocks 41 to 48, and especially to curtail the design cost of the system LSI for integrating multifarious functions into one chip.

In this way, by setting up the global clock distribution circuits 2 in reverse direction to each other and doubly to distribute the global clock signal, and forming and distributing the local clock signals on each of the plural circuit blocks 41 to 48 which constitute the LSI, the effects by device deviation, temperature fluctuation, and power supply voltage fluctuation, etc. can be compensated and the clock signals can be distributed at low skew over the LSI.

Furthermore, by inserting a plurality of clock buffers 30-m, 31-m in the global clock distribution circuit 2 and making the line between the respective clock buffers 30-m, 31-m sufficiently short, there is less effect of inter-line coupling or noise, and it becomes possible to make high speed distribution of clock signals.

Furthermore, because the number and the position of the local clock generating circuit 4-m to be connected to the global clock distribution circuit 2 are optional, freedom of design layout can be elevated, and the design layout cost of the clock distribution circuit 2 can be reduced.

Furthermore, as it is possible to design and layout the local clock forming and distribution circuits 51–58 with the respective circuit blocks 41 to 48 constituting LSI without relying on and independent from other circuit blocks, module formation or library formation of the circuit blocks 41 to 48 is facilitated to improve re-utilization properties, and the design cost of the system LSI can be curtailed. Also, clock controls such as frequency change or clock stoppage can be easily done in the unit of the circuit blocks 41 to 48.

In this case, since the different clock frequencies and power supply voltages can be easily selected in each of the circuit blocks 41 to 48 constituting the LSI, the pertinent clock frequency and power supply voltage may be selected in the respective circuit blocks 41 to 48 to curtail the power consumption.

As described above, according to the present invention, by comprising global clock forming means for forming a global clock signal based on the reference clock signal inputted from the external source, global clock distribution means for distributing the global clock signal formed in the above global clock forming means in the large scale integrated circuit and disposed in the large scale integrated circuit like double loop form in reverse direction to each other formed in the global clock forming means, local clock forming means for forming a local clock signal on the basis of the intermediate phase of each phase of the two global clock signals distributed by the above global clock distribution means, and local clock distribution means for distributing the local clock signal formed in the local clock forming means to a region in the vicinity of the own means, the system has an effect of being capable of distributing the low skew and high speed clocks on the LSI.

What is claimed is:

1. A clock signal distribution circuit comprising:
   global clock forming means for forming a global clock signal based on a reference clock signal inputted from an external source;
   global clock distribution means for distributing said global clock signal formed in said global clock forming means in a large scale integrated circuit and disposed in said large scale integrated circuit in a double loop form formed in said global clock forming means, said global clock distribution means distributing the global clock signal doubly and in parallel on the large scale integrated circuit in a reverse direction to one another;
   local clock forming means for forming a local clock signal on the basis of an intermediate phase of each phase of two global clock signals distributed by said global clock distribution means; and
   local clock distribution means for distributing said local clock signal formed in said local clock forming means to a region in the vicinity of the local clock forming means.

2. A clock signal distribution circuit comprising:
   global clock forming means for forming a global clock signal based on a reference clock signal inputted from an external source;
   global clock distribution means for distributing said global clock signal formed in said global clock forming means in a large scale integrated circuit and disposed in said large scale integrated circuit in a double loop form formed in said global clock forming means;
   local clock forming means for forming a local clock signal on the basis of an intermediate phase of each phase of two global clock signals distributed by said global clock distribution means; and
   local clock distribution means for distributing said local clock signal formed in said local clock forming means to a region in the vicinity of the local clock means,
   wherein said global clock distribution means comprises:
      a plurality of clock buffer couples comprising first and second clock buffers for holding the global clock signals which are transmitted in the reverse direction to each other;
      a first line for connecting the adjacent first clock buffers to one another; and a second line arranged in parallel with the first line for connecting the second clock buffers.

3. The clock signal distribution circuit according to claim 2, wherein the plural global clock buffer couples are all laid out at equal distance in the large scale integrated circuit and are to be connected by the first and the second line of equal length.

4. A clock signal distribution circuit comprising:
    global clock forming means for forming a global clock signal based on a reference clock signal inputted from an external source;
    global clock distribution means for distributing said global clock signal formed in said global clock forming means in a large scale integrated circuit and disposed in said large scale integrated circuit in a double loop form formed in said global clock forming means;
    local clock forming means for forming a local clock signal on the basis of an intermediate phase of each phase of two global clock signals distributed by said global clock distribution means; and
    local clock distribution means for distributing said local clock signal formed in said local clock forming means to a region in the vicinity of the local clock means,
    wherein the local clock forming means comprises:
        first and second variable delay means which make the delay amount of the global clock signal freely variable according to the external signal, and have the same constitution;
        phase comparison means for comparing the phase of the clock signal delayed by the first and the second variable delay means with the phase of the global clock signal transmitted from the reverse direction to the clock signal; and
        control means for variably controlling the delay amounts in the first and second variable delay means based on the results of comparison by the phase comparison means, so that the global clock distribution means forms the local clock signal having the intermediate phase of the respective phases of the two global clock signals which are distributed from the reverse direction to each other.

5. The clock signal distribution circuit according to claim 4, wherein the phase comparison means include the first and second dividing means for dividing the clock signal delayed by the first and second variable delay means and the global clock signal transmitted from the direction reverse to said clock signal, respectively, so that the operation is free even when the phase difference between the clock signal delayed by the first and second variable delay means and the global clock signal transmitted from the reverse direction to said clock signal is larger than one-half of the cycle time of the input.

6. A clock signal distribution circuit comprising:
    global clock forming means for forming a global clock signal based on a reference clock signal inputted from an external source;
    global clock distribution means for distributing said global clock signal formed in said global clock forming means in a large scale integrated circuit and disposed in said large scale integrated circuit in a double loop form formed in said global clock forming means;
    local clock forming means for forming a local clock signal on the basis of an intermediate phase of each phase of two global clock signals distributed by said global clock distribution means; and
    local clock distribution means for distributing said local clock signal formed in said local clock forming means to a region in the vicinity of the local clock forming means,
    wherein a local clock forming means comprises:
        first and second variable delay means which make a delay amount of the global clock signal freely variable according to the external signal, and have the same constitution;
        first and second fixed delay means for delaying the global clock signal transmitted from the reverse direction to said global clock signal by the preset predetermined delay amount;
        phase comparison means for comparing the phase of the clock signal delayed by the first and the second variable delay means with the phase of the clock signal delayed by the first and second fixed delay means; and
        control means for variably controlling the delay amounts in the first and second variable delay means based on the results of comparison by the phase comparison means, so that the global clock distribution means forms the local clock signal having an intermediate phase of the respective phases of the two global clock signals which are distributed from the reverse direction to each other.

7. The clock signal distribution circuit according to claim 6, wherein the phase comparison means comprise the first and second dividing means for dividing the clock signal delayed by the first and second variable delay means and the global clock signal delayed by the first and second fixed delay means; so that even when the phase difference between the global clock signal delayed by the first and second variable delay means and the global clock signal delayed by the first and second fixed delay means is larger than one-half of the cycle time of the input.

8. A clock signal distribution circuit comprising:
    global clock forming means for forming a global clock signal based on a reference clock signal inputted from an external source;
    global clock distribution means for distributing said global clock signal formed in said global clock forming means in a large scale integrated circuit and disposed in said large scale integrated circuit in a double loop form formed in said global clock forming means;
    local clock forming means for forming a local clock signal on the basis of an intermediate phase of each phase of two global clock signals distributed by said global clock distribution means; and
    local clock distribution means for distributing said local clock signal formed in said local clock forming means to a region in the vicinity of the local clock means,
    wherein the local clock distribution means includes a clock tree circuit for distributing the local clock signal formed by the local clock forming means.

9. The clock signal distribution circuit according to claim 8, wherein the local clock distribution means comprises:
    a clock tree circuit for distributing the local clock signal formed by the local clock forming means; and
    a delay-locked loop circuit for offsetting a phase difference between the local clock signal and the clock signal fed back from the clock tree circuit.

10. The clock signal distribution circuit according to claim 1, wherein the local clock distribution means comprise:
    a clock tree circuit for distributing the local clock signal formed by the local clock forming means; and
    a phase-locked loop circuit for offsetting the phase difference between the local clock signal and the clock signal fed back from the clock tree circuit.

11. A clock signal distribution circuit comprising:

global clock forming means for forming a global clock signal based on a reference clock signal inputted from an external source;

global clock distribution means for distributing said global clock signal formed in said global clock forming means in a large scale integrated circuit and disposed in said large scale integrated circuit in a double loop form formed in said global clock forming means;

local clock forming means for forming a local clock signal on the basis of an intermediate phase of each phase of two global clock signals distributed by said global clock distribution means; and local clock distribution means for distributing said local clock signal formed in said local clock forming means to a region in the vicinity of the local clock means, wherein the local clock forming means and the local clock distribution means are provided on each of a plurality of circuit blocks constituting the large scale integrated circuit.

12. The clock signal distribution circuit according to claim 11, wherein the plurality of circuit blocks have respectively inherent power supply voltages and clock frequencies.

13. The clock signal distribution circuit according to claim 1, wherein said global clock distribution means comprises:

a plurality of clock buffer couples comprising first and second clock buffers for holding the global clock signals which are transmitted in the reverse direction to each other.

14. The clock signal distribution circuit according to claim 1, wherein the local clock forming means comprises:

first and second variable delay means which make a delay amount of the global clock signal freely variable according to an external signal from the external source, and have the same constitution; and phase comparison means for comparing a phase of the global clock signal delayed by the first and the second variable delay means with the phase of the global clock signal transmitted from the reverse direction to the global clock signal.

15. The clock signal distribution circuit according to claim 14, wherein the local clock forming means comprises:

control means for variably controlling the delay amounts in the first and second variable delay means based on the results of comparison by the phase comparison means.

16. The clock signal distribution circuit according to claim 1, wherein the local clock forming means comprises:

first and second fixed delay means for delaying the global clock signal transmitted from the reverse direction to said global clock signal by a preset predetermined delay amount.

17. The clock signal distribution circuit according to claim 1, wherein the local clock distribution means comprises:

a delay-locked loop circuit for offsetting a phase difference between the local clock signal and a local clock signal fed back from a clock tree circuit.

18. A clock signal distribution circuit comprising:

a global clock generator for forming a global clock signal based on a reference clock signal inputted from an external source;

a global clock distributor for distributing said global clock signal formed in said global clock generator in a large scale integrated circuit and disposed in said large scale integrated circuit in a double loop form formed in said global clock generator, said global clock distributor distributing the global clock signal doubly and in parallel on the large scale integrated circuit in a reverse direction to one another;

a local clock generator for forming a local clock signal on the basis of an intermediate phase of each phase of two global clock signals distributed by said global clock distributor; and a local clock distributor for distributing said local clock signal formed in said local clock generator to a region in the vicinity of the local clock generator.

19. A method of distributing a clock signal, said method comprising:

forming a global clock signal based on a reference clock signal inputted from an external source;

distributing said global clock signal in a large scale integrated circuit and disposed in said large scale integrated circuit in a double loop form;

forming a local clock signal in a local clock forming unit on the basis of an intermediate phase of each phase of two global clock signals distributed by a global clock distributor;

distributing said local clock signal to a region in the vicinity of the local clock forming unit with a local clock distributor; and varying a delay amount of said global clock signal in accordance with an external signal from the external source.

20. The method of distributing a clock signal, as claimed in claim 19, further comprising:

holding in a plurality of clock buffer couples, comprising first and second clock buffers, the global clock signals which are transmitted in the reverse direction to each other;

connecting adjacent first clock buffers to one another with a first line; and connecting the second clock buffers with a second line arranged in parallel with the first line.

21. The method of distributing a clock signal, as claimed in claim 20, further comprising:

laying out said plurality of clock buffer couples comprising first and second clock buffers at equal distance in a large scale integrated circuit and connected by said first line and said second line of an equal length.

22. The method of distributing a clock signal, as claimed in claim 19, further comprising:

comparing a phase of the global clock signal delayed by first and second variable delay units with a phase of the global clock signal transmitted from a reverse direction to the clock signal with a phase comparator; and controlling variably the delay amounts in the first and the second variable delay units based on the results of comparison by a phase comparator, so that the global clock distributor forms the local clock signal having the intermediate phase of the respective phases of the two global clock signals which are distributed from the reverse direction to each other.

23. The method of distributing a clock signal, as claimed in claim 22, wherein said comparing said phase of the global clock signal further comprises dividing the global clock signal delayed by said first and second variable delay units and the global clock signal transmitted from the direction reverse to said global clock signal by first and second dividers.

24. The method of distributing a clock signal, as claimed in claim 19, wherein forming a local clock signal further comprises:

delaying with first and second fixed delay units a global clock signal transmitted from a reverse direction to said global clock signal by a fixed delay amount;

comparing with a phase comparator a phase of a global clock signal delayed by first and second variable delay units with a phase of the global clock signal delayed by the first and second fixed delay units; and controlling variably the delay amounts in the first and second variable delay units based on the results of comparison by the phase comparator, so that the global clock distributor forms the local clock signal having the intermediate phase of the respective phases of the two global clock signals which are distributed from the reverse direction to each other.

25. The method of distributing a clock signal, as claimed in claim 19, wherein distributing said local clock signal comprises:

distributing the local clock signal using a clock tree circuit; and offsetting a phase difference between the local clock signal and the clock signal fed back from said clock tree circuit with a delay-locked loop circuit.

26. The method of distributing a clock signal, as claimed in claim 19, comprising:

providing said local clock forming unit and said local clock distributor on each of a plurality of circuit blocks constituting the large scale integrated circuit.

* * * * *